(12) United States Patent
Grubb et al.

(10) Patent No.: US 12,536,368 B2
(45) Date of Patent: Jan. 27, 2026

(54) SYSTEMS AND METHODS FOR PERSISTENT INHERITANCE OF ARBITRARY DOCUMENT CONTENT

(71) Applicant: SPECTRUM MOBILE HEALTH INC., Vancouver (CA)

(72) Inventors: Morgan Grubb, Cowichan Bay (CA); Jason Buck, Salt Spring Island (CA)

(73) Assignee: SPECTRUM MOBILE HEALTH INC., Vancouver (CA)

( * ) Notice: Subject to any disclaimer, the term of this patent is extended or adjusted under 35 U.S.C. 154(b) by 0 days.

(21) Appl. No.: 17/887,036

(22) Filed: Aug. 12, 2022

(65) Prior Publication Data

US 2023/0138785 A1 May 4, 2023

Related U.S. Application Data

(60) Provisional application No. 63/273,663, filed on Oct. 29, 2021.

(51) Int. Cl.
| | | |
|---|---|---|
| *G06F 40/174* | (2020.01) | |
| *G06F 16/93* | (2019.01) | |
| *G06F 40/10* | (2020.01) | |
| *G06F 40/143* | (2020.01) | |
| *G06F 40/186* | (2020.01) | |
| *G06F 40/30* | (2020.01) | |

(52) U.S. Cl.
CPC ............ *G06F 40/174* (2020.01); *G06F 16/93* (2019.01)

(58) Field of Classification Search
None
See application file for complete search history.

(56) References Cited

U.S. PATENT DOCUMENTS

| | | | |
|---|---|---|---|
| 6,157,934 A * | 12/2000 | Khan | ................... G06Q 10/10 |
| | | | 715/769 |
| 9,202,084 B2 | 12/2015 | Moore | |
| 10,943,673 B2 | 3/2021 | Zhang et al. | |
| 2007/0061393 A1 | 3/2007 | Moore | |
| 2012/0173481 A1* | 7/2012 | Poth | ................... G06Q 10/10 |
| | | | 707/E17.008 |
| 2017/0270113 A1* | 9/2017 | Ebeling | ................... G06F 16/93 |

* cited by examiner

Primary Examiner — Mustafa A Amin
(74) Attorney, Agent, or Firm — Perry + Currier Inc.

(57) ABSTRACT

A method in a computing device includes: storing a first structured document including a first plurality of fields, respective first values for each of the first plurality of fields, and respective first unique identifiers for each of the first plurality of fields; storing a second structured document including a second plurality of fields, respective second values for each of the second plurality of fields, and respective second unique identifiers for each of the second plurality of fields; receiving, from a client computing device, an inheritance command including a source identifier selected from the second unique identifiers, and a destination identifier selected from the first unique identifiers; storing an inheritance indicator containing the source identifier, in association with the destination identifier; and inserting the second value corresponding to the source identifier into the first structured document, in association with the first field corresponding to the destination identifier.

17 Claims, 8 Drawing Sheets

SYSTEMS AND METHODS FOR PERSISTENT INHERITANCE OF ARBITRARY DOCUMENT CONTENT

CROSS-REFERENCE TO RELATED APPLICATION

This application claims priority to U.S. provisional patent application No. 63/273,663 filed Oct. 29, 2021, the contents of which is incorporated herein by reference.

BACKGROUND

Information relevant to the performance of activities in any of a wide variety of contexts may be collected into documents for use as reference material during the performance of such activities. For example, documents can be created and stored containing patient treatment guidelines in healthcare facilities, material handling guidance in manufacturing facilities, and so on. Although such documents may be created and maintained by distinct entities, one document (e.g., treatment guidelines maintained by one healthcare facility) may contain information that is semantically related to another document (e.g., treatment guidelines maintained by another healthcare facility). Automated detection and maintenance of such semantic relationships between documents may be difficult or impossible to implement, however, e.g., due to variability in the content of such documents.

SUMMARY

The present disclosure provides, in some embodiments, a method in a computing device includes: storing a first structured document including a first plurality of fields, respective first values for each of the first plurality of fields, and respective first unique identifiers for each of the first plurality of fields; storing a second structured document including a second plurality of fields, respective second values for each of the second plurality of fields, and respective second unique identifiers for each of the second plurality of fields; receiving, from a client computing device, an inheritance command including a source identifier selected from the second unique identifiers, and a destination identifier selected from the first unique identifiers; storing an inheritance indicator containing the source identifier, in association with the destination identifier; and inserting the second value corresponding to the source identifier into the first structured document, in association with the first field corresponding to the destination identifier.

The present disclosure provides, in additional embodiments, a computing device including: a memory storing: a first structured document including (i) a first plurality of fields, (ii) respective first values for each of the first plurality of fields, and (iii) respective first unique identifiers for each of the first plurality of fields; and storing a second structured document including (i) a second plurality of fields, (ii) respective second values for each of the second plurality of fields, and (iii) respective second unique identifiers for each of the second plurality of fields; a communications interface; and a processor configured to: receive, from a client computing device via the communications interface, an inheritance command including (i) a source identifier selected from the second unique identifiers, and (ii) a destination identifier selected from the first unique identifiers; store, in the memory, an inheritance indicator containing the source identifier, in association with the destination identifier; and insert the second value corresponding to the source identifier into the first structured document, in association with the first field corresponding to the destination identifier.

The present disclosure provides, in further embodiments, a non-transitory computer-readable medium storing instructions executable by a processor of a computing device to: store a first structured document including (i) a first plurality of fields, (ii) respective first values for each of the first plurality of fields, and (iii) respective first unique identifiers for each of the first plurality of fields; store a second structured document including (i) a second plurality of fields, (ii) respective second values for each of the second plurality of fields, and (iii) respective second unique identifiers for each of the second plurality of fields; receive, from a client computing device via the communications interface, an inheritance command including (i) a source identifier selected from the second unique identifiers, and (ii) a destination identifier selected from the first unique identifiers; store, in the memory, an inheritance indicator containing the source identifier, in association with the destination identifier; and insert the second value corresponding to the source identifier into the first structured document, in association with the first field corresponding to the destination identifier.

BRIEF DESCRIPTIONS OF THE DRAWINGS

Embodiments are described with reference to the following figures.

DETAILED DESCRIPTION

Figure 1:
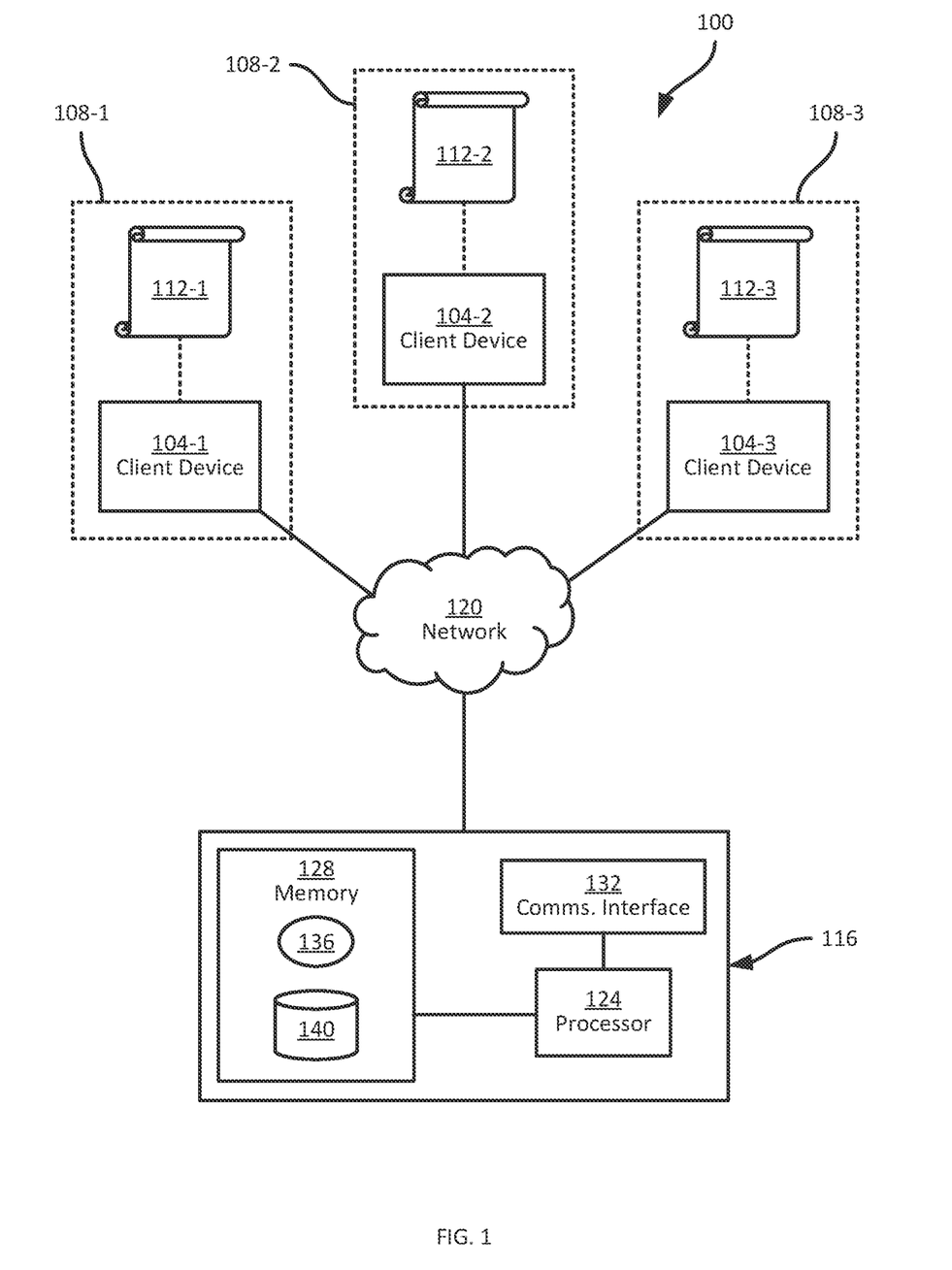
FIG. 1 is a diagram of a system for persistent inheritance of arbitrary content between documents

FIG. 1 illustrates a system 100 for implementing persistent inheritance of arbitrary content between documents. The system 100 includes a plurality of client computing devices 104-1, 104-2, and 104-3 (collectively referred to as client devices 104, and generically as a client device 104; similar nomenclature is used elsewhere in the discussion below). In other examples, as will be apparent, the system 100 can include as few as two client computing devices 104, and can also include more than three client devices 104. The client devices 104 can be implemented as any suitable form of computing device, including desktop computers, tablet computers, and the like. Each client device 104 is associated with a distinct corresponding operating entity 108-1, 108-2, and 108-3. Each client device 104 is also associated with a corresponding document 112-1, 112-2, and 112-3. The documents 112 contain various information, e.g., related to activities performed by the operating entities 108, by staff at the operating entities 108, or the like.

The specific nature of the operating entities 108 is not limited, beyond the fact that the entities 108 are independent of one another. The entities 108 may, however, engage in related activities. For example, in the discussion below, the entities 108 are assumed to be healthcare organizations. For example, the entity 108-1 may be a general hospital, while the entity 108-2 may be a pediatric hospital and the entity 108-3 may be an intergovernmental health organization. As noted above, the entities 108 can take a wide variety of other forms in other examples; the above examples are provided merely to illustrate that the entities 108 may have some features in common. As a result, the documents 112 guiding activities performed by or within each entity 108 may contain information relating to similar or identical activities.

The content of the documents 112 is unlikely to be identical, however. For example, due to variations between the entities 108 (e.g., the fact that the entity 108-2, in this example, exclusively treats children, while the entity 108-1 treats patients with a broader range of ages), one document 112 may contain more extensive information relevant to a particular subset of activities than the other documents. Variations in content between the documents 112 can also arise for reasons beyond expertise.

For any given entity 108, therefore, some content from documents 112 hosted by other entities 108 may be relevant, e.g., to supplement or otherwise enhance the content of the "local" document 112. Exchanging such content, however, is complicated by various factors. For example, despite the semantic similarities between documents 112 or portions thereof, the specific vocabulary and/or organizational structure used in each document 112 may vary widely. Automating the detection of related portions of documents 112 may therefore be computationally intractable, and/or suffer from low accuracy. Further, the differing formats, vocabularies, and the like of the documents 112 also complicate the establishment of persistent semantic connections between the documents 112. As a result, content exchange, e.g., in the healthcare context mentioned above, may involve not only traversing the documents 112 and manually reproducing content from a source document 112 into a destination or recipient document 112, but also periodically repeating that process to ensure that updates to the source document 112 are reproduced in the recipient document 112. As will be apparent to those skilled in the art, the above process is time-consuming and may simply lead to content exchange being abandoned.

The system 100 includes further components implementing various functionality to facilitate the creation of arbitrary semantic links between documents 112, and the persistent tracking of such semantic links. In particular, the system 100 includes a server 116 (which is illustrated as a single computing device, but can be implemented in a distributed manner, as a plurality of computing devices representing one logical server). The server 116 is connected to a network 120 (e.g., any suitable combination of local and wide-area networks), enabling the server 116 and the client devices 104 to communicate with one another. As will be described in greater detail below, the server 116 implements various functions to adapt the documents 112 for content exchange, and to persistently maintain semantic links between arbitrarily-located and arbitrarily-sized portions of source and destination documents 112. In particular, the functionality implemented by the server 116 enables any given document 112 to inherit content from any other document 112, and for such inherited content to be updated automatically in response to updates to the source document 112. The above functionality retains control of each document 112, however, with the corresponding entity 108 (e.g., rather than centralizing control of the documents 112 as in some content management systems, or dividing control of portions of a document between entities 108).

Certain internal components of the server 116 are also illustrated in FIG. 1. In particular, the server 116 includes a processor 124 (e.g., one or more central processing units, graphics processing units, or the like) interconnected with a non-transitory computer-readable medium such as a memory 128 (e.g., any suitable combination of volatile and non-volatile memory components). The processor 124, memory 128, and communications interface 132 can each be implemented as one or more integrated circuits.

The memory 128 stores a plurality of computer-readable instructions, e.g., in the form of a document management application 136. The application 136, when executed by the processor 124, configures the server 116 to perform the functionality described below. As will be apparent, in other examples the application 136 can be implemented as a suite of distinct applications. The memory 128 also stores, in the illustrated example, a repository 140 employed to store various data via execution of the application 136.

Figure 2:
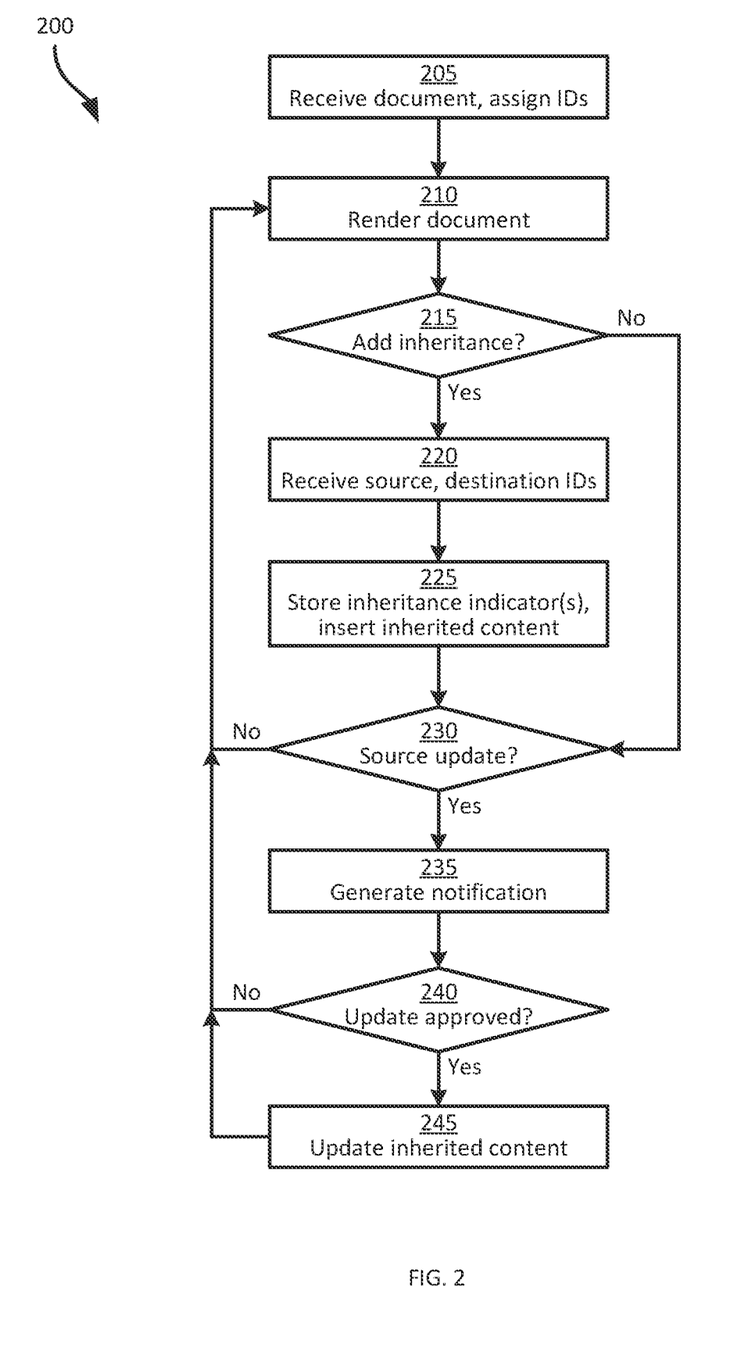
FIG. 2 is a flowchart of method for persistent inheritance of arbitrary content between documents

Turning to FIG. 2, a method 200 of implementing persistent inheritance of arbitrary content between documents is illustrated. The method 200 is described below in conjunction with its performance in the system 100, and particularly by the server 116. As will be apparent, however, the method 200 can also be performed in other suitable systems.

At block 205, the server 116 is configured to receive a document 112 from a client device 104, in order to prepare the document 112 for tracking of persistent inheritance to and from other documents 112. The document 112 received at block 205 is referred to as a structured document, in that the semantic content of the document 112 is presented in a machine-readable format. For example, the document 112 can be in an eXtensible Markup Language (XML)-based format. Any of a wide variety of other formats can also be employed by the document 112, however. More generally, the document 112 as received at block 205 includes a plurality of fields, and respective values for such fields. That is, the document 112 is defined by a series of field-value pairs, with the fields and values being detectable by the processor 124 via the use of predetermined characters or character sequences. Of particular note, however, the schema of the document 112—that is, which fields are used and what values are contained therein, as well as the semantic meanings and semantic relationships between those fields and values—are not relevant to the functionality implemented by the server 116. Moreover, the schema of any given document 112 is not expected to align with the schema of any other document 112. Therefore, beyond requiring each entity 108 to place the corresponding document 112 into a structured format, the system 100 imposes no further limitations on the content or structure of the document 112.

In response to receiving the document 112, the server 116 is configured to assign unique identifiers to the above-mentioned fields. The unique identifiers, that is, need not be present in the original document 112 and therefore need not be created or managed by the entity 108. As will be evident in the discussion below, the unique identifiers assigned by the server 116 enable programmatic access to any portion of the document 112, which often is not otherwise available in the absence of semantic interpretation of the document 112.

Figure 3:
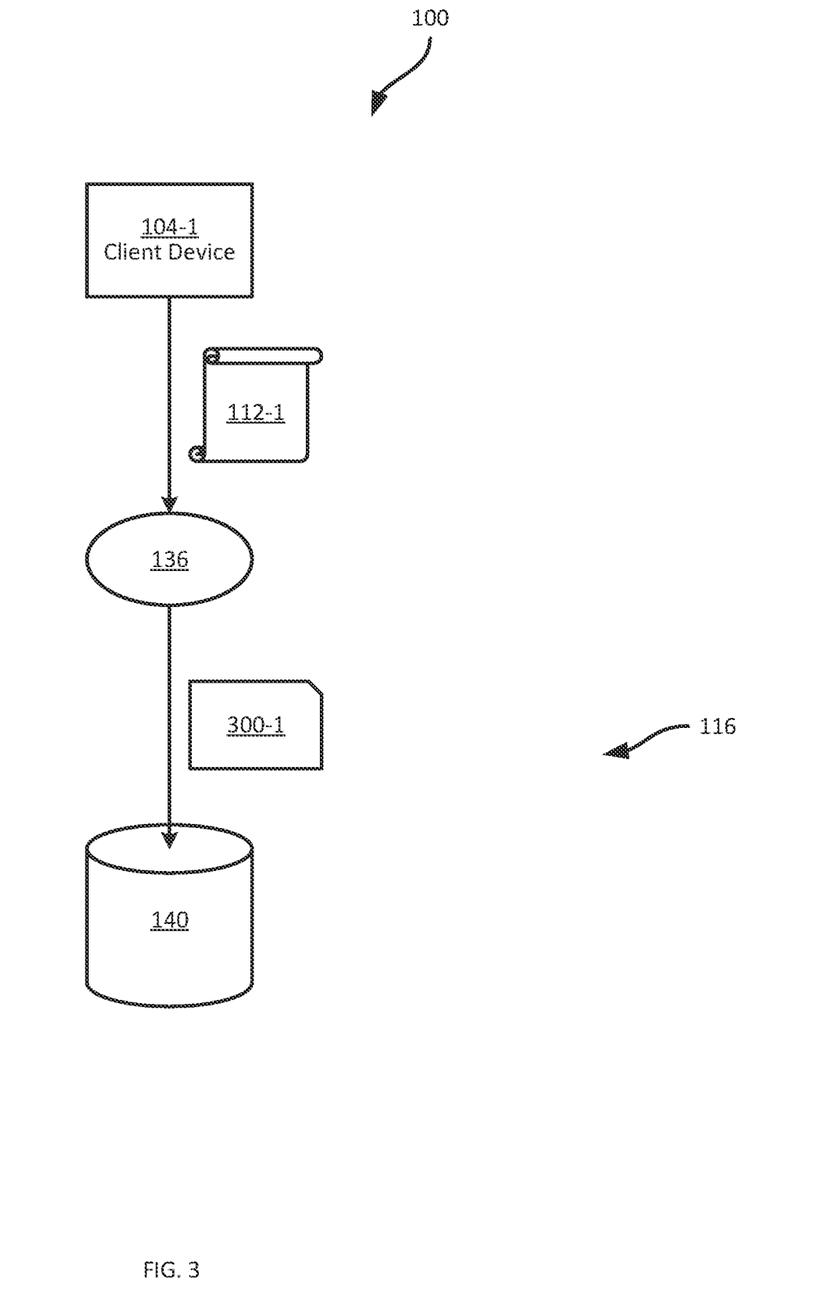
FIG. 3 is a diagram illustrating an example performance of block 205 of the method of FIG. 2.

Turning briefly to FIG. 3, an example performance of block 205 in connection with the document 112-1 is illustrated. In particular, the client device 104-1 transmits the document 112-1 to the server 116 via the network 120 (e.g., using a graphical user interface hosted by the server 116, or the like), The application 136 implements an abstraction layer (which may also be referred to as a data abstraction and transport layer) that converts the document 112-1 into an adapted document 200-1 that includes not only the content of the original document 112-1, but also the above-mentioned unique identifiers.

Figure 4:
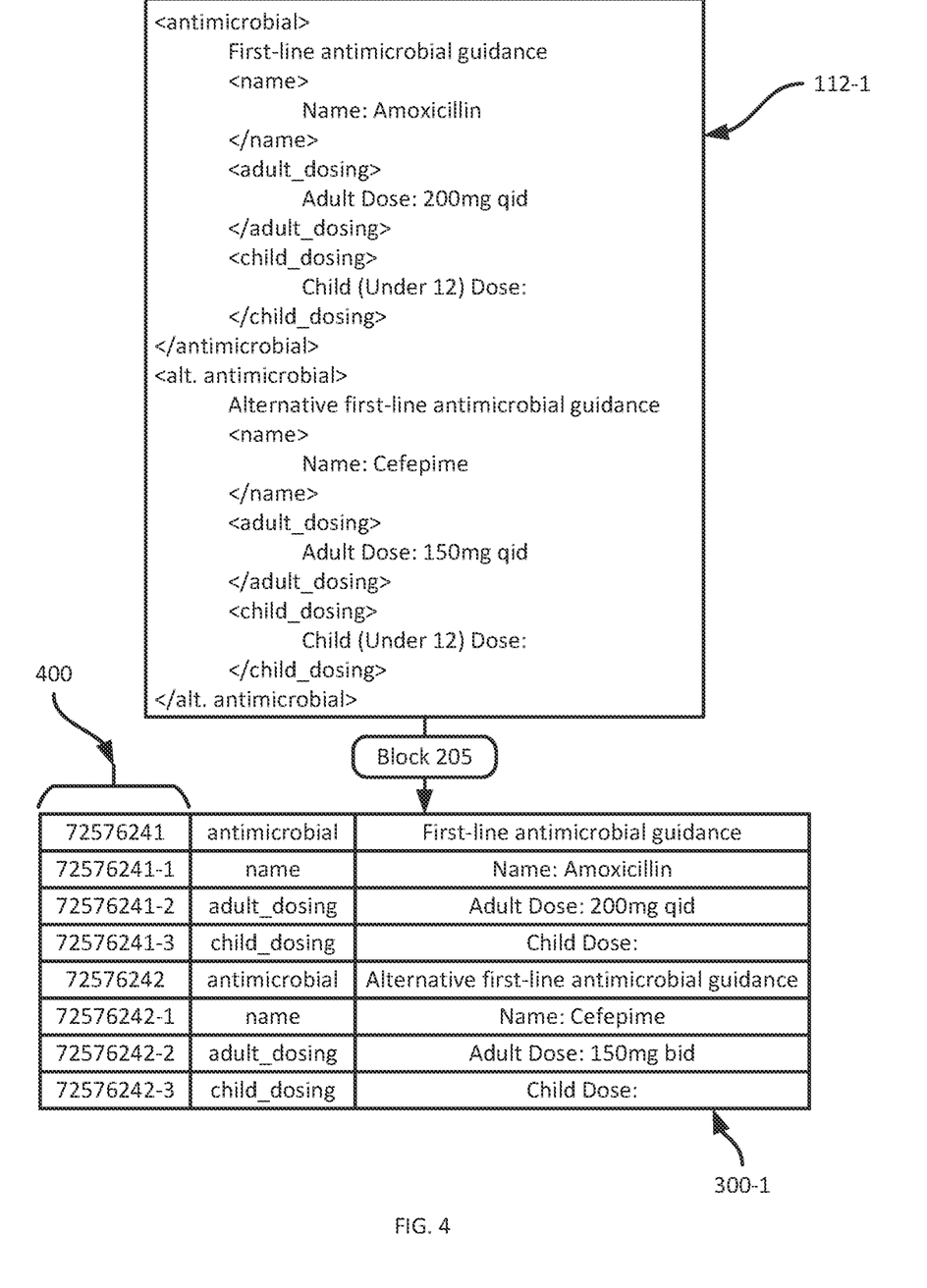
FIG. 4 is a diagram illustrating an example performance of block 205 of the method of FIG. 2 in greater detail.

FIG. 4 illustrates an example performance of block 205 in greater detail, in connection with the document 112-1. As noted earlier, in this example the document 112-1 contains treatment guidance employed at a general hospital or other suitable healthcare facility (i.e., the entity 108-1). A portion of the document 112-1 is illustrated, detailing dosage guidelines for two antibiotics. As shown in FIG. 4, the content of the document 112-1 is organized into fields containing values. In this example, the fields are delimited by opening field identifiers enclosed between angled brackets "<" and ">", and closing field identifiers enclosed between the string "</" and an angled bracket ">". A wide variety of other field delimiters can also be employed. Further, as noted above, the selection of which fields the document 112-1 includes, and what values those fields contain, is not relevant to the functionality implemented by the server 116.

In the example portion of the document 112-1 shown in FIG. 4, the fields can also define a hierarchy, such that certain fields are contained within, or are otherwise subsidiary to, earlier fields. Thus, for example, the field "antimicrobial" contains a value "First-line antimicrobial guidance", as well as the fields "name", "adult_dosing", and "child_dosing" (which also contain their own corresponding values). As shown in FIG. 4, the fields "child_dosing" each include the value "Child (Under 12) Dose", but do not also include actual dosage values, whereas the fields "adult_dosing" do contain specific dosage guidance.

As will be apparent from FIG. 4, the schema of the document 112-1 uses the same field names repeatedly, e.g., the field "adult_dosing" as mentioned above. Specifically, the document 112-1 defines dosage guidance for two distinct antibiotics (amoxicillin and cefepime, in this example), and re-uses the same field names in different semantic contexts (one associated with Amoxicillin, and the other associated with Cefepime). In the absence of detected semantic relationships between fields in the document 112, such repetition complicates the establishment of links between arbitrary portions of the document 112-1 and another document 112. The unique identifiers assigned at block 205 avoid the need for detecting semantic relationships and still providing granular, programmatic access to any individual field, or any set of fields, in the document 112-1. Specifically, as shown in the lower portion of HG. 4, an example form of the adapted document 300-1 is shown. The specific format of the adapted document 300-1 is not particularly limited. Of note, the adapted document 300-1 includes not only the fields and values, but also unique identifiers 400, each uniquely distinguishing a corresponding field from not only all other fields in the document 112-1, but also from all other fields in any other adapted documents stored at the server 116.

In this example, each unique identifier is a numerical identifier, although in other examples the unique identifiers can also be alphanumerical, or have any other suitable format. Further, as illustrated in FIG. 4, the unique identifiers indicate the position of a field in a hierarchy, e.g., with a hyphen and a sequence number ("-1", "-2", etc.) indicating that the field is a child field. The absence of a hyphen, therefore indicates that the field is a top-level field, and additional hyphens can be employed to indicate additional depth in a hierarchy. A wide variety of other mechanisms for indicating hierarchical relationships via the unique identifiers can also be employed. In some examples, a portion of the unique identifiers 400 (e.g., the leading four digits, or the like) can identify the document 112-1 itself. In other examples, however, the document 112-1 can have a separate unique identifier within the repository 140.

Figure 5:
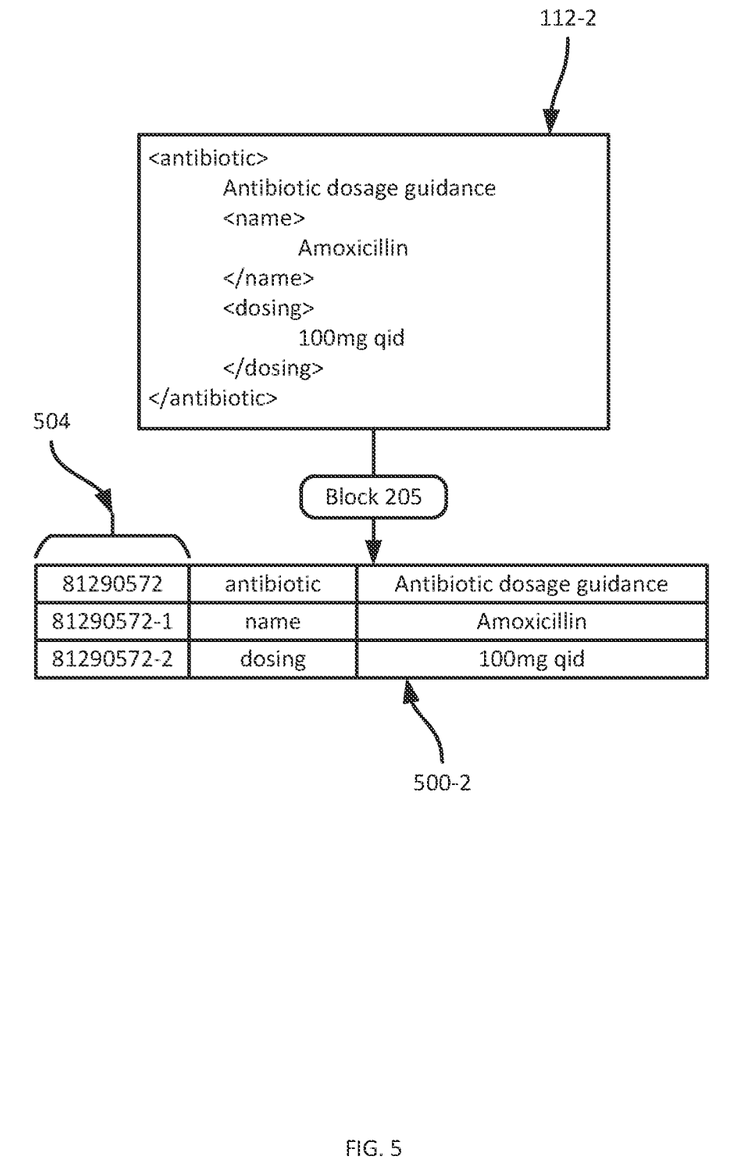
FIG. 5 is a diagram illustrating another example performance of block 205 of the method of FIG. 2.

Prior to establishing links between documents 112 for inheriting content, at least one other document 112 must also be processed via block 205 and stored in the repository 140. It is assumed, therefore, that the client devices 104-2 and 104-3 also provide the documents 112-2 and 112-3 to the server 116 for adaptation and storage in the repository 140 via additional performances of block 205. For example, FIG. 5 illustrates a portion of the document 112-2, which defines a set of fields and corresponding values that are structurally similar to those of the document 112-1. However, the fields and values of the document 112-2 may not have semantic links to those in the document 112-1 that are readily detectable by natural language processing or other machine-implemented mechanisms. For example, the document 112-2 includes a "dosing" field for amoxicillin, but it may not be readily detectable whether that dosage is relevant to the adult or child dosing for the same compound as presented in the document 112-1.

The adapted document 500-2 resulting from a performance of block 205 in connection with the document 112-2 includes the fields and names from the document 112-2, as well as unique identifiers 504 for those fields. The unique identifiers 504 are distinct from each other and from the unique identifiers 400 of the adapted document 300-1, as shown in FIG. 4.

Returning to Fla 2, at block 210 the server 116 can be configured to render the document processed at block 205, e.g., by providing at least a portion of the adapted document 300-1 to the client device 104-1 for presentation of the relevant portion on a display of the client device 104-1. For example, the client device 104-1 can be operated to request access to the document 112-1, e.g., in connection with treating a patient, and/or to initiate the creation of a semantic link between the document 112-1 and another document 112.

At block 215, the server 116 is configured to determine whether to create a semantic link as mentioned above. The determination at block 215 can include, for example, determining whether a selectable element on an interface rendered at block 210 has been selected by an operator of the client device 104-1. When the determination at block 215 is affirmative, the server 116 proceeds to blocks 220 and 225 to generate a semantic link, as discussed below. When the determination at block 215 is negative, the server 116 can advance to block 230, e.g., to monitor the documents stored in the repository 140 for updates, and process updates according to any stored semantic links.

The creation of a semantic link, enabling one document 112 to persistently inherit arbitrary content from one or more other documents 112, can be initiated via the selection of a button or other interface element as noted above. In response to selection of such an element, the server 116 is configured, at block 220, to receive an inheritance command including a source identifier and a destination identifier. The destination identifier is a unique field identifier selected from the "local" document 112. That is, if the inheritance command is received from the client device 104-1, the destination identifier is one of the unique identifiers 400 (of the adapted document 300-1). The source identifier, on the other hand, is a unique identifier from a "remote" document, such as one of the identifiers 504 of the adapted document 500-2.

Figure 6:
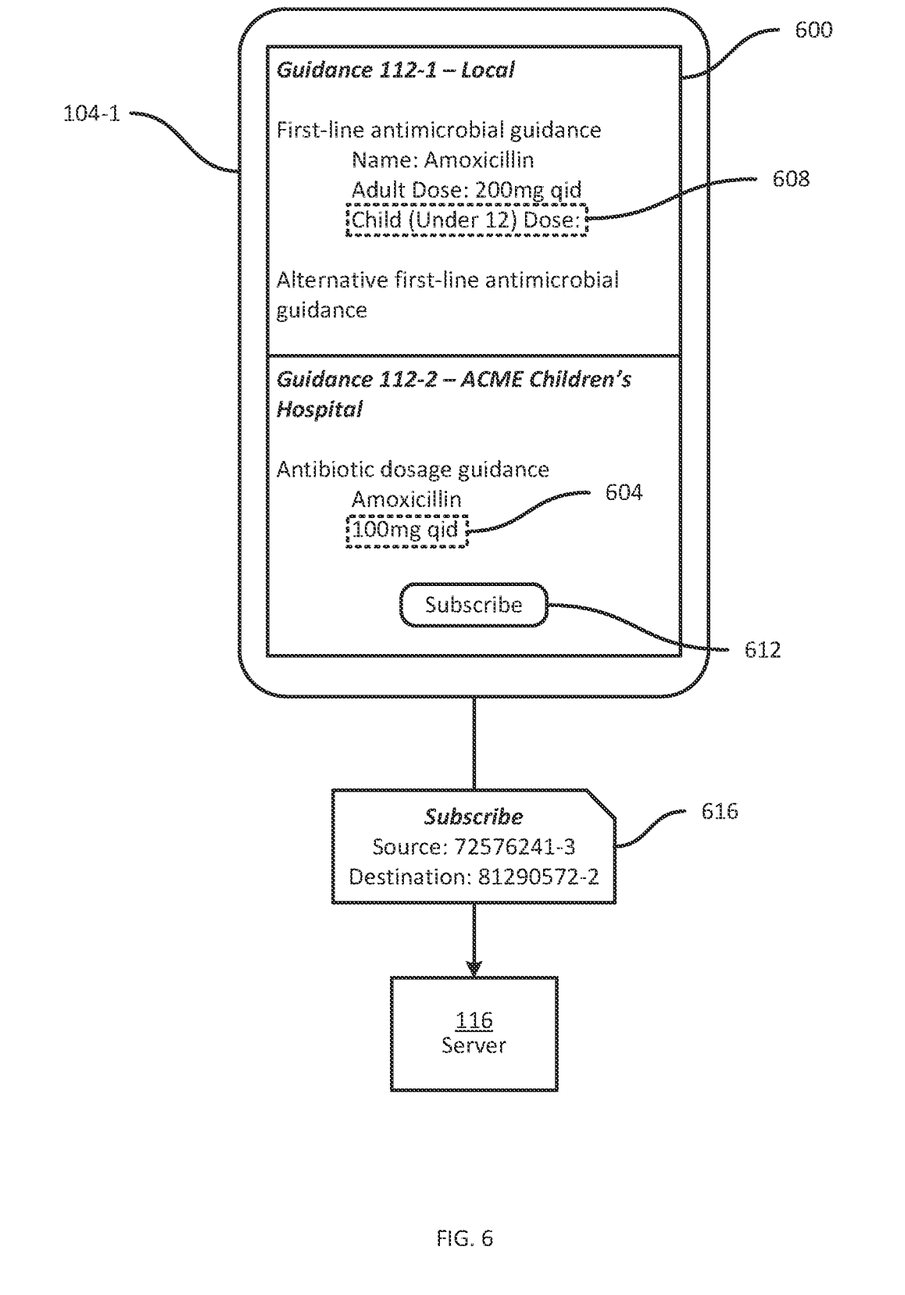
FIG. 6 is a diagram illustrating an example performance of block 220 of the method of FIG. 2.

Turning to FIG. 6, the client device 104-1 is illustrated having accessed the document 112-1, as well as the document 112-2. For example, in response to selecting the above-mentioned element for creating a semantic link between documents, the client device 104-1 may receive, from the server 116, a list of other documents available from the repository 140. The client device 104-1 may also search the repository 140 for a source document 112, e.g., by the name of the entity 108 associated with that document 112. The document 112-1 and the document 112-2, or portions thereof, are therefore presented on a display 600 of the client device 104-1.

As shown in FIG. 6, the operator of the client device 104-1 can select a source field 604, and a destination field 608, indicating that the content of the source field 604 is to be imported into the destination field 608. The selections of source and destination fields are therefore arbitrary, in that they do not depend on any semantic relationship being detected by the server 116. Selection of a confirmation element 612 can lead to the transmission of an inheritance command 616 from the client device 104-1 to the server 116, containing the unique identifiers of the selected fields.

Returning to FIG. 2, at block 225 the server 116 is configured, in response to receiving the source and destination identifiers, to store an inheritance indicator containing the source identifier in association with the destination identifier. The server 116 is also configured to insert inherited content into the destination document (112-1, in this example). The inherited content, specifically, is the content of the selected source identifier. That is, the inherited content is the value contained in the selected source field, including any lower-level fields contained within the source field.

As will now be apparent, therefore, the unique addressing of each individual field in the documents 112, as well as the preservation of hierarchical relationships between the fields of a given document 112, enables any arbitrarily-sized chunk of a document to be marked as related to any arbitrarily-sized chunk of another document. For example, selection of a single field in the source document can be used to inherit that field and all lower-level fields contained therein. On the other hand, direct selection of a subset of the lower-level fields can be used to inherit only those lower-level fields.

Figure 7:
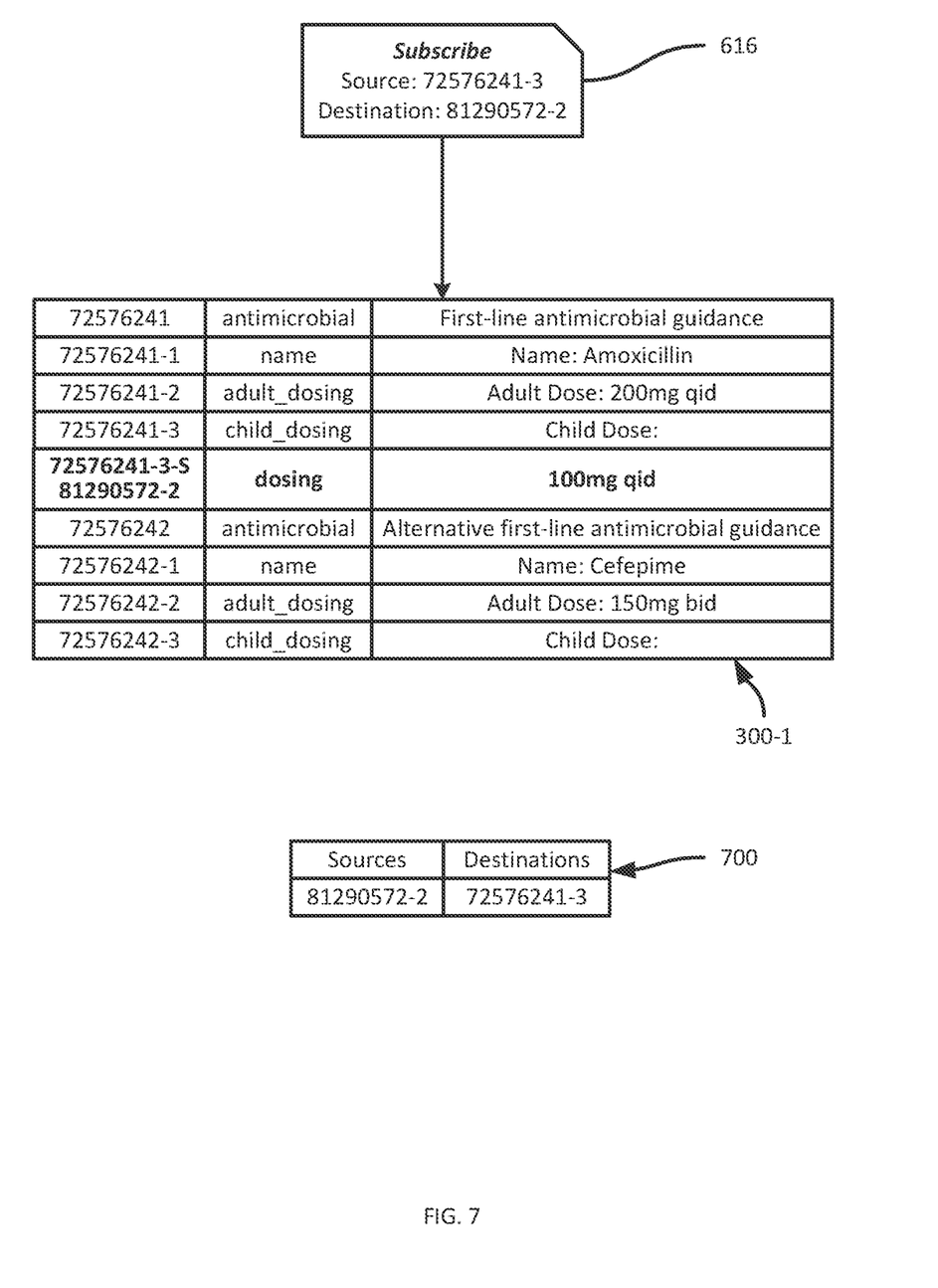
FIG. 7 is a diagram illustrating an example performance of block 225 of the method of FIG. 2.

Turning to FIG. 7, an updated version of the adapted document 300-1 following a performance of block 225 is illustrated. In particular, the "dosing" field from the document 112-2 has been inserted into the adapted document 300-1. Further, the adapted document 300-1 includes an inheritance indicator containing the unique source identifier "81290572-2" of the inserted field, as well as the string "72576241-3-S", indicating that the inserted field is inherited from another document, and is linked to the local field "child_dosing". A wide variety of other mechanisms for formatting and storing inheritance indicators are also contemplated. In some implementations, the server 116 can also update the repository 140 with a subscription record 700, separate from the documents 112, containing source and destination identifier pairs for each semantic link established via the process set out above.

Figure 8:
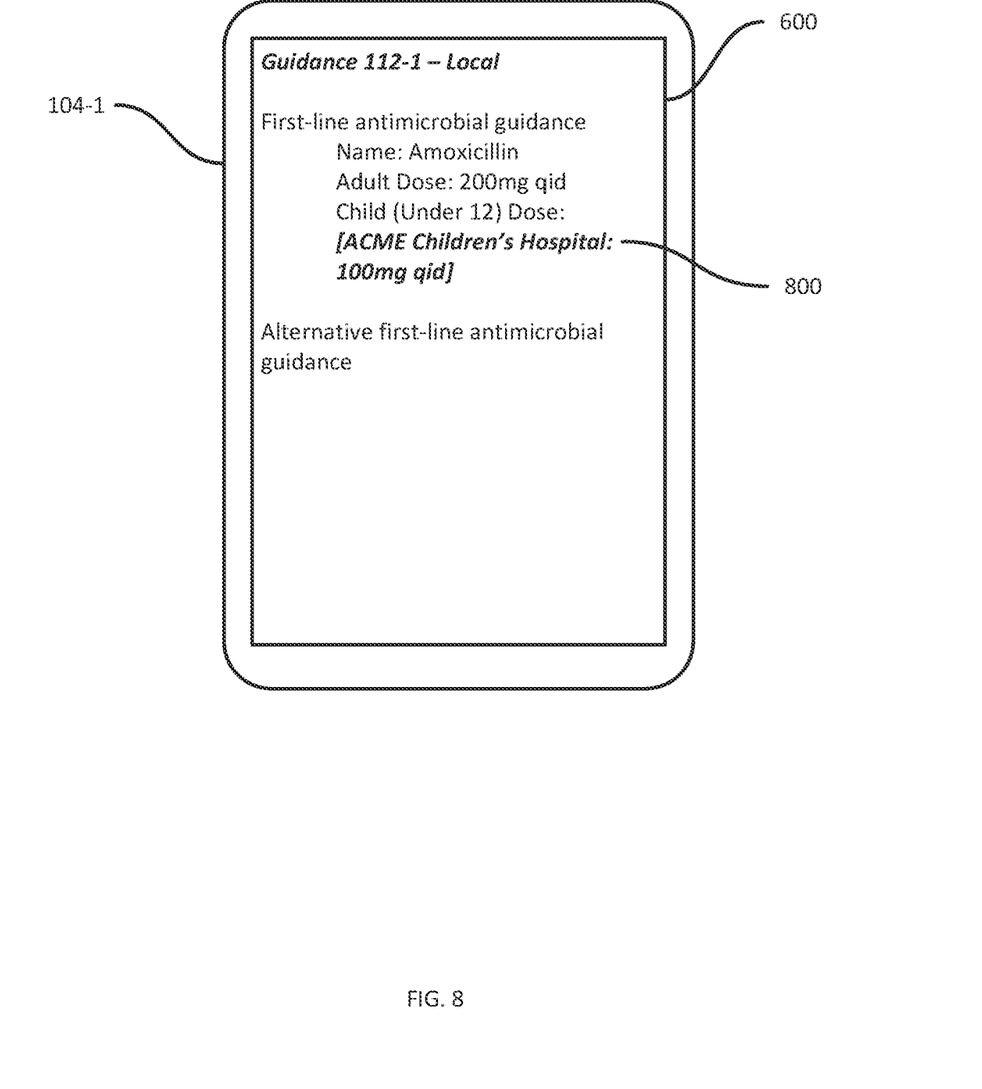
FIG. 8 is a diagram illustrating rendering of a document following the example performances of blocks 220 and 225 of FIGS. 6 and 7.

Returning to FIG. 2, at block 230 the server 116 can be configured to monitor the documents in the repository 140 for updates, to enable such updates to be reflected in other documents 112 with semantic links to the updated document (s). When the determination at block 230 is negative, the server 116 can continue rendering documents according to requests from client devices 104, and/or generating additional inheritance links as discussed above. For example, FIG. 8 illustrates an updated rendering of the adapted document 300-1 following generation of the inheritance link as shown in FIGS. 6 and 7. In particular, FIG. 8 shows the adapted document 300-1, with the inserted child dosage inherited from the document 112-2 (i.e., the adapted document 500-2). In the illustrated example, the document is rendered with an indicator 800 visually indicating that the following information is inherited. The indicator 800 can include, for example, the name of the entity 108-2. A wide variety of other indicators can also be employed. In some examples, the indicator 800 can be omitted, such that the dosage value "100 mg qid" appears as an element of the document 112-1, without any sign that the dosage value originated elsewhere.

Referring again to FIG. 2, when the determination at block 230 is affirmative, the server 116 proceeds to block 235. The server 116 can be, for example, configured to monitor each document stored in the repository 140 for updates, e.g., made by client devices 104. When an update to a given document 112 is detected (e.g., an update to the document 500-2, the server 116 is configured to determine whether the update affects a subscribed chunk (that a chunk that is the source in an inheritance link). The server 116 may determine, for instance, based on the subscription record 700, whether the source field itself, or a parent field of the source field, has been updated. When the determination is affirmative, the server 116 can generate a notification at block 235, for transmission to any client devices 104 associated with the destination document.

For example, if the source field with the unique identifier "81290572-2" was updated by the client device 104-2, the server 116 can generate and send a notification to the client device 104-1, indicating that the source field linked to the field 72576241-3 in the document 112-1 has been updated. The notification can include selectable elements to approve or deny the update (e.g., skip the update without dismantling the inheritance link). The server 116 is configured to determine at block 240, whether an approval of the update has been received. When the update is approved, the server 116 updates the inherited content in the destination field at block 245. Otherwise, the update is not applied to the destination field. The server 116 can maintain historical activity for each document, e.g., by maintaining a configurable number of past versions of the document, or of each individual destination field in the document.

Various modifications and/or additional features are also contemplated, and can be combined with the embodiments set out above. In some examples, inheritance commands such as the command 616 shown in FIGS. 6 and 7 can include exclusions rather than subscriptions. That is, an inheritance command may include the identifier of a top-level field, implying inheritance of all lower-level fields contained therein. The inheritance command may also, however, explicitly identify a subset of the lower-level fields and indicate that the subset of lower-level fields are excluded from inheritance.

As will be apparent to those skilled in the art, a source document from which a destination document inherits content need not be the ultimate source of that content. The source document itself can, for example, subscribe to yet another source document for the same content. In such arrangements, updating of the ultimate source document can lead to updates in any directly-subscribing documents (e.g., via blocks 230-245 as described above). Any further documents that subscribe to the same content may then also receive updates via additional performances of blocks 230-245, effectively cascading updates from the ultimate source to the final subscribing document.

Those skilled in the art will appreciate that in some embodiments, the functionality of the server as configured by execution of the application 136 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method in a computing device, the method comprising:
storing a first structured document including (i) a first plurality of fields identifying respective patient treatment guidelines, and (ii) respective first values for each of the first plurality of fields, each first value defining a first dosage or recommendation for a corresponding patient treatment guideline;
generating respective first unique identifiers for each of the first plurality of fields, and storing the first unique identifiers in the first structured document;
storing a second structured document including (i) a second plurality of fields identifying the respective patient treatment guidelines, and (ii) respective second values for each of the second plurality of fields, each second value defining a second dosage or recommendation for the corresponding patient treatment guideline;
generating respective second unique identifiers for each of the second plurality of fields, and storing the second unique identifiers in the second structured document;
receiving, from a client computing device, a plurality of inheritance commands each including (i) respective source identifiers selected from the second unique identifiers, and (ii) a common destination identifier selected from the first unique identifiers;
in response to the inheritance commands:
storing a plurality of inheritance indicators in association with the destination identifier, each inheritance indicator containing a respective source identifier; and
inserting, into the one of the first plurality of fields corresponding to the common destination identifier, each of the second values corresponding to the source identifiers, such that the one of the first plurality of fields contains a first dosage or recommendation, and a plurality of the second dosages or recommendations;
retaining the inheritance indicators as persistent definitions of the relationship between the first plurality of fields and the second plurality of fields.

2. The method of claim 1, wherein storing the first structured document includes:
receiving, from a client computing device, input data defining the first plurality of fields and the first values, the input data excluding the first unique identifiers.

3. The method of claim 1, wherein inserting the second value includes inserting the second value into the first field corresponding to the destination identifier.

4. The method of claim 1, further comprising:
receiving a request to present the first structured document from the client device; and
retrieving and transmitting, to the client device, at least a portion of the first structured document including the inserted second value.

5. The method of claim 1, wherein storing the inheritance indicator includes inserting the source identifier into the first field corresponding to the destination identifier.

6. The method of claim 1, wherein storing the inheritance indicator includes storing a subscription record, distinct from the first structured document and the second structured document, with the source identifier and the destination identifier.

7. The method of claim 1, further comprising:
detecting an update to the second value corresponding to the source identifier, in the second structured document; and
updating the first structured document with the updated second value.

8. The method of claim 7, further comprising:
prior to updating the first structured document, transmitting an update notification to the client device; and
receiving an approval command from the client device.

9. A computing device, comprising:
a memory storing:
a first structured document including (i) a first plurality of fields identifying respective patient treatment guidelines, and (ii) respective first values for each of the first plurality of fields, each first value defining a first dosage or recommendation for a corresponding patient treatment guideline;
generate respective first unique identifiers for each of the first plurality of fields, and store the first unique identifiers in the first structured document; and
storing a second structured document including (i) a second plurality of fields identifying the respective patient treatment guidelines, and (ii) respective second values for each of the second plurality of fields, each second value defining a second dosage or recommendation for the corresponding patient treatment guideline;
generate respective second unique identifiers for each of the second plurality of fields, and store the second unique identifiers in the second structured document;
a communications interface; and
a processor configured to:
receive, from a client computing device via the communications interface, a plurality of inheritance commands each including (i) respective source identifiers selected from the second unique identifiers, and (ii) a common destination identifier selected from the first unique identifiers;
in response to the inheritance commands:
store, in the memory, a plurality of inheritance indicators in association with the destination identifier, each inheritance indicator containing a respective source identifier; and
insert, into the one of the first plurality of fields corresponding to the common destination identifier, each of the second values corresponding to the source identifiers, such that the one of the first plurality of fields contains a first dosage or recommendation, and a plurality of the second dosages or recommendations;
retain the inheritance indicators as persistent definitions of the relationship between the first plurality of fields and the second plurality of fields.

10. The computing device of claim 9, wherein the processor is configured to store the first structured document by:

receiving, from a client computing device, input data defining the first plurality of fields and the first values, the input data excluding the first unique identifiers.

11. The computing device of claim 9, wherein the processor is configured to insert the second value by inserting the second value into the first field corresponding to the destination identifier.

12. The computing device of claim 9, wherein the processor is further configured to:
receive a request to present the first structured document from the client device; and
retrieve and transmit, to the client device, at least a portion of the first structured document including the inserted second value.

13. The computing device of claim 9, wherein the processor is configured to store the inheritance indicator by inserting the source identifier into the first field corresponding to the destination identifier.

14. The computing device of claim 9, wherein the processor is configured to store the inheritance indicator by storing a subscription record, distinct from the first structured document and the second structured document, with the source identifier and the destination identifier.

15. The computing device of claim 9, wherein the processor is further configured to:
detect an update to the second value corresponding to the source identifier, in the second structured document; and
update the first structured document with the updated second value.

16. The computing device of claim 15, wherein the processor is further configured to:
prior to updating the first structured document, transmit an update notification to the client device; and
receive an approval command from the client device.

17. A non-transitory computer-readable medium storing instructions executable by a processor of a computing device to:
store a first structured document including (i) a first plurality of fields identifying respective patient treatment guidelines, and (ii) respective first values for each of the first plurality of fields, each first value defining a first dosage or recommendation for a corresponding patient treatment guideline;
generate respective first unique identifiers for each of the first plurality of fields, and store the first unique identifiers in the first structured document;
store a second structured document including (i) a second plurality of fields identifying the respective patient treatment guidelines, and (ii) respective second values for each of the second plurality of fields, each second value defining a second dosage or recommendation for the corresponding patient treatment guideline, and (iii);
generate respective second unique identifiers for each of the second plurality of fields, and store the second unique identifiers in the second structured document;
receive, from a client computing device via the communications interface, a plurality of inheritance commands each including (i) respective source identifiers selected from the second unique identifiers, and (ii) a common destination identifier selected from the first unique identifiers;
in response to the inheritance commands:
store, in the memory, a plurality of inheritance indicators in association with the destination identifier, each inheritance indicator containing a respective source identifier; and
insert, into the one of the first plurality of fields corresponding to the common destination identifier, each of the second values corresponding to the source identifiers, such that the one of the first plurality of fields contains a first dosage or recommendation, and a plurality of the second dosages or recommendations;
retain the inheritance indicators as persistent definitions of the relationship between the first plurality of fields and the second plurality of fields.

\* \* \* \* \*